US012033791B2

(12) United States Patent
Terashima et al.

(10) Patent No.: US 12,033,791 B2
(45) Date of Patent: Jul. 9, 2024

(54) METHOD FOR FORMING FILM AND METHOD FOR MANUFACTURING ELECTRICAL STEEL SHEET WITH INSULATING FILM

(71) Applicant: JFE Steel Corporation, Tokyo (JP)

(72) Inventors: Takashi Terashima, Tokyo (JP); Karin Kokufu, Tokyo (JP); Makoto Watanabe, Tokyo (JP); Toshito Takamiya, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 17/769,049

(22) PCT Filed: Sep. 16, 2020

(86) PCT No.: PCT/JP2020/034998

§ 371 (c)(1),
(2) Date: Apr. 14, 2022

(87) PCT Pub. No.: WO2021/084951

PCT Pub. Date: May 6, 2021

(65) Prior Publication Data

US 2024/0105384 A1 Mar. 28, 2024

(30) Foreign Application Priority Data

Oct. 31, 2019 (JP) ................................ 2019-198434

(51) Int. Cl.

| | |
|---|---|
| ***B05D 3/00*** | (2006.01) |
| ***B05D 7/14*** | (2006.01) |
| ***B05D 7/24*** | (2006.01) |
| ***C21D 6/00*** | (2006.01) |
| ***C21D 8/12*** | (2006.01) |
| ***C21D 9/46*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/16*** | (2006.01) |
| ***C22C 38/60*** | (2006.01) |
| ***C23C 22/07*** | (2006.01) |
| ***H01F 41/00*** | (2006.01) |

(52) U.S. Cl.

CPC ............. *H01F 41/00* (2013.01); *C21D 6/005* (2013.01); *C21D 6/008* (2013.01); *C21D 8/1222* (2013.01); *C21D 8/1233* (2013.01); *C21D 8/1261* (2013.01); *C21D 8/1272* (2013.01); *C21D 8/1283* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/16* (2013.01); *C22C 38/60* (2013.01); *C23C 22/07* (2013.01); *C22C 2202/02* (2013.01)

(58) Field of Classification Search

CPC ......... H01F 41/00; C21D 6/005; C21D 6/008; C21D 8/1272; C21D 8/1283; C21D 9/46; C22C 38/60; C23C 22/07

See application file for complete search history.

(56) References Cited

U.S. PATENT DOCUMENTS

| | | | | |
|---|---|---|---|---|
| 3,856,568 | A | 12/1974 | Tanaka et al. | |
| 3,985,583 | A | 10/1976 | Shimanaka et al. | |
| 6,899,770 | B1 * | 5/2005 | Goodreau ............ | C10M 173/02 148/264 |
| 2006/0147636 | A1 * | 7/2006 | Cooprider ............ | B05C 1/0808 118/400 |
| 2014/0349021 | A1 | 11/2014 | Hargett et al. | |
| 2017/0313887 | A1 * | 11/2017 | Kwon ................. | C21D 8/1233 |

FOREIGN PATENT DOCUMENTS

| | | | | |
|---|---|---|---|---|
| BR | 112019008234 | A2 | | 7/2019 |
| EP | 3 533 901 | A1 | | 9/2019 |
| JP | 4839338 | A | | 6/1973 |
| JP | 5079442 | A | | 6/1975 |
| JP | 0867913 | A | | 3/1996 |
| JP | 08239771 | A | | 9/1996 |
| JP | H09-235679 | A | | 9/1997 |
| JP | 11138534 | A | * | 5/1999 |
| JP | 11138534 | A | | 5/1999 |
| JP | 2003-181366 | A | | 7/2003 |

(Continued)

OTHER PUBLICATIONS

International Search Report and Written Opinion for International Application No. PCT/JP2020/034998, dated Nov. 10, 2020, 5 pages.
Office Action (The First Office Action) issued Sep. 23, 2022, by the State Intellectual Property Office of People's Republic of China in corresponding Chinese Patent Application No. 202080072504.8 and an English translation of the Office Action. (10 pages).
Office Action (The Second Office Action) issued Mar. 16, 2023, by the State Intellectual Property Office of People's Republic of China in corresponding Chinese Patent Application No. 202080072504.8 and an English translation of the Office Action. (7 pages).
The extended European Search Report issued Oct. 5, 2022, by the European Patent Office in corresponding European Patent Application No. 20881173.7 - 1103. (8 pages).

(Continued)

*Primary Examiner* — Robert S Walters, Jr.
*Assistant Examiner* — Kristen A Dagenais
(74) *Attorney, Agent, or Firm* — Buchanan Ingersoll & Rooney PC

(57) ABSTRACT

A method for forming a film on a surface of a steel sheet includes applying a treatment solution for forming a film containing a fibrous material to the surface of the steel sheet by using a coater under a condition in which a difference between a speed of the steel sheet and a speed of an applicator of the coater is 1.0 m/min or more, inclining the surface of the steel sheet, to which the treatment solution for forming a film has been applied, at an angle of 10° or more with respect to a horizontal plane until drying is started, and thereafter drying the steel sheet.

16 Claims, No Drawings

(56) References Cited

FOREIGN PATENT DOCUMENTS

| | | | | |
|---|---|---|---|---|
| JP | 2003-311208 | A | | 11/2003 |
| JP | 2004-155921 | A | | 6/2004 |
| JP | 2008526477 | A | * | 7/2008 |
| JP | 2008526477 | A | | 7/2008 |
| JP | 2010-075814 | A | | 4/2010 |
| JP | 201252293 | A | * | 3/2012 |
| JP | 2012052293 | A | | 3/2012 |
| JP | 2016525933 | A | | 9/2016 |
| JP | 2016525933 | A | * | 9/2016 |
| JP | 2018504516 | A | | 2/2018 |

OTHER PUBLICATIONS

Korean Office Action for Korean Application No. 10-2022-7013526, dated Apr. 1, 2024 with Concise Statement of Relevance of Office Action. (6 pages).

* cited by examiner

METHOD FOR FORMING FILM AND METHOD FOR MANUFACTURING ELECTRICAL STEEL SHEET WITH INSULATING FILM

CROSS REFERENCE TO RELATED APPLICATIONS

This is the U.S. National Phase application of PCT/JP2020/034998, filed Sep. 16, 2020 which claims priority to Japanese Patent Application No. 2019-198434, filed Oct. 31, 2019, the disclosures of these applications being incorporated herein by reference in their entireties for all purposes.

FIELD OF THE INVENTION

The present invention relates to a method for forming a film and a method for manufacturing an electrical steel sheet with an insulating film. The present invention relates to, in particular, a method for manufacturing an electrical steel sheet with an insulating film which is excellent in terms of film tension and film adhesiveness.

BACKGROUND OF THE INVENTION

An electrical steel sheet is a soft magnetic material which is widely used as an iron core material for rotators and stators. In particular, a grain-oriented electrical steel sheet, which is a soft magnetic material used as an iron core material for transformers and electric generators, has a crystalline texture in which the <001> orientation, which is an easily magnetized axis of iron, is highly oriented in the rolling direction of the steel sheet. Such a texture is formed through secondary recrystallization in which crystal grains with a (110)[001] orientation, which is called a Goss orientation, are preferentially grown into huge grains when secondary recrystallization annealing is performed in the manufacturing process of the grain-oriented electrical steel sheet.

Generally, an insulating film composed mainly of phosphate (phosphate film) is formed on the surface of a grain-oriented electrical steel sheet. The phosphate film is formed on the surface of the grain-oriented electrical steel sheet to provide an insulation capability, workability, a rust-prevention capability, and so forth. The phosphate film is formed at a high temperature higher than 800° C. and has a lower thermal expansion coefficient than a steel sheet. Accordingly, the steel sheet is provided with tension due to the difference between the thermal expansion coefficient of the steel sheet and the thermal expansion coefficient of the film when the temperature is decreased to room temperature, which results in the effect of decreasing iron loss. Also in the case of a non-oriented electrical steel sheet, it is preferable that the steel sheet be provided with tensile stress to decrease the degree of deterioration in properties due to compressive stress. Therefore, in industrial fields of grain-oriented electrical steel sheets, it is desirable that steel sheets be provided with as high tension as possible, for example, a tension of 8 MPa or more, as described in Patent Literature 1.

To meet such a request, various kinds of vitreous films have been proposed to date. For example, Patent Literature 2 proposes a film composed mainly of magnesium phosphate, colloidal silica, and chromic anhydride. In addition, Patent Literature 3 proposes a film composed mainly of aluminum phosphate, colloidal silica, and chromic anhydride.

In addition, as an example of a method for increasing tension applied to a steel sheet by an insulating film, Patent Literature 4 proposes a technique utilizing fibrous colloidal silica. Patent Literature 5 proposes a technique utilizing ceramic nanofibers.

PATENT LITERATURE

PTL 1: Japanese Unexamined Patent Application Publication No. 8-67913

PTL 2: Japanese Unexamined Patent Application Publication No. 50-79442

PTL 3: Japanese Unexamined Patent Application Publication No. 48-39338

PTL 4: Japanese Unexamined Patent Application Publication No. 8-239771

PTL 5: Japanese Unexamined Patent Application Publication (Translation of PCT Application) No. 2018-504516

SUMMARY OF THE INVENTION

Nowadays, in response to growing awareness of environmental problems, there is a strong demand for developing a Cr-free film. Since the Cr-free film has a high thermal expansion coefficient, there is a problem of a decrease in tension (film tension) applied to a steel sheet. Therefore, an increase in film tension is an important issue to be addressed.

It was found that there is a problem in the case where the technique according to Patent Literature 4 or Patent Literature 5, which is intended to increase film tension, is used for a Cr-free film. That is it is not always possible to realize the effect of sufficiently increasing film tension and a film peeling tends to occur at a slit edge (sheared end surface) when slitting work is performed.

An object according to aspects of the present invention is to provide a method for forming a film with which it is possible to form a film excellent in terms of film tension and film adhesiveness.

In addition, an object according to aspects of the present invention is to provide a method for manufacturing an electrical steel sheet with an insulating film, in which an insulating film having excellent film tension and film adhesiveness is formed on the surface of the electrical steel sheet.

The present inventors diligently conducted investigations regarding a method for solving the problems described above, considered that the problems are caused by the fact that the arrangement of fibrous materials in an insulating film is not optimized, and devised a method for solving the problems. That is, it is ideal that the long axes of fibrous materials in an insulating film be oriented in the rolling direction. However, in the case where conditions under which a treatment solution for forming an insulating film containing fibrous materials is applied to the surface of a steel sheet are not appropriate, there is an increased deviation in the long axis directions of the fibrous materials from the rolling direction. As a result of such variation, it was considered that the peeling of the insulating film occurs because stress due to shearing propagates through the fibrous materials in a direction perpendicular to the rolling direction when slit (shearing) work is performed. On the basis of such a consideration, the present inventors diligently conducted investigations regarding a method for orienting the long axes of fibrous materials in an insulating film in the rolling direction and, as a result, found that it is possible to solve the problems described above by optimizing conditions for coating by a coater and drying.

That is, aspects of the present invention have the following constitutions.

[1] A method for forming a film on a surface of a steel sheet, which includes applying a treatment solution for forming a film containing a fibrous material to the surface of the steel sheet by using a coater under a condition in which a difference between a speed of the steel sheet and a speed of an applicator of the coater is 1.0 m/min or more, inclining the surface of the steel sheet, to which the treatment solution for forming the film has been applied, at an angle of 10° or more with respect to a horizontal plane until a drying is started, and thereafter starting the drying of the steel sheet.

[2] The method for forming a film according to item [1], in which a surface tension of the treatment solution for forming a film is 60 mN/m or more and 80 mN/m or less.

[3] The method for forming a film according to item [1] or [2], in which a ratio of a long axis length to a short axis length (long axis length/short axis length) of the fibrous material is 1.5 or more and 50.0 or less.

[4] The method for forming a film according to any one of items [1] to [3], in which a linear thermal expansion coefficient of the fibrous material in a temperature range of 25° C. to 800° C. is $1.0\times10^{-5}$/K or less.

[5] A method for manufacturing an electrical steel sheet with an insulating film, which includes forming an insulating film on a surface of the electrical steel sheet by using the method for forming a film according to any one of items [1] to [4].

According to aspects of the present invention, it is possible to provide a method for forming a film which is excellent in terms of film tension and film adhesiveness.

According to aspects of the present invention, it is possible to control the arrangement of fibrous materials in a film by (i) applying a treatment solution for forming a film containing fibrous materials to the surface of a steel sheet by using a coater in such a manner that a difference between a speed of the steel sheet and a speed of an applicator of the coater is controlled, (ii) controlling an inclination of the surface of the steel sheet to which the treatment solution for forming a film has been applied, and (iii) thereafter drying the steel sheet. In addition, by forming an insulating film on the surface of an electrical steel sheet by using this method, it is possible to provide a method for manufacturing an electrical steel sheet with an insulating film, in which the tension applied to the steel sheet by the insulating film is increased and the film adhesiveness at a slit edge is improved when slitting work is performed.

DETAILED DESCRIPTION OF EMBODIMENTS OF THE INVENTION

Experimental results which form the basis of aspects of the present invention will be described.

First, samples were manufactured in the following manner.

A steel sheet having a length in the rolling direction of 300 mm and a length in a direction perpendicular to the rolling direction of 100 mm was taken by shearing a grain-oriented electrical steel sheet having a thickness of 0.30 mm which had been manufactured by using a known method and which had been subjected to finish annealing. Thereafter, unreacted annealing separator was removed, and stress relief annealing (at 800° C. for 2 hours in a $N_2$ atmosphere) was performed. A film composed mainly of forsterite was formed on the surface of this steel sheet. Then, light pickling was performed in a 5 mass % phosphate aqueous solution.

Subsequently, an aqueous solution containing magnesium primary phosphate in an amount of 100 pts·mass in terms of solid content, colloidal silica (having a spherical shape) in an amount of 50 pts·mass in terms of $SiO_2$ solid content, and cordierite (having a ratio of a long axis length to a short axis length (long axis length/short axis length) of 5.0) in an amount of 10 pts·mass was diluted with pure water so as to have a specific gravity of 1.20 to prepare a treatment solution for forming an insulating film (coating solution). Here, the cordierite crystal had a hexagonal column shape having a short axis length of 0.8 μm, a long axis length of 4.0 μm, and a linear thermal expansion coefficient in a temperature range from room temperature (25° C.) to a temperature of 800° C. of $2.9\times10^{-6}$/K (long axis direction). In addition, the surface tension of the coating solution was 70 mN/m.

By using the methods described in items 1) to 3) below, the coating solution prepared as described above was applied to the steel sheet which had been subjected to light pickling as described above.

1) By using a natural roll coater having two rolls (difference between a speed of the steel sheet and a speed of the applicator roll: 0 m/min), the coating solution was applied so that a total coating weight was 8.0 g/$m^2$ on both sides of a steel sheet after having been dried.

2) By using a bar coater (difference between a speed of the steel sheet and a speed of the bar: 0.5 m/min), the coating solution was applied to one side of the steel sheet and dried at a time so that the total coating weight was 8.0 g/$m^2$ on both sides of a steel sheet after having been dried.

3) By using a bar coater (difference between a speed of the steel sheet and a speed of the bar: 2.0 m/min), the coating solution was applied to one side of the steel sheet and dried at a time so that the total coating weight was 8.0 g/$m^2$ on both sides of a steel sheet after having been dried.

Each of the steel sheets having a surface to which the coating solution had been applied by using the respective methods described in items 1) to 3) above was placed in two ways, i.e., the surface of the steel sheet was horizontal in one case and the surface of the steel sheet was vertical (perpendicular to the horizontal direction) in the other case, immediately after the coating solution had been applied, and inserted in a drying furnace so as to be dried (300° C. for 1 minute). Subsequently, baking was performed at a temperature of 890° C. for 15 seconds in an atmosphere containing 100% of $N_2$ to obtain samples of grain-oriented electrical steel sheets with insulating films, in which insulating films are formed on surfaces of the steel sheets. Here, in the case of items 2) and 3), baking was performed after the coating solution had been applied to one side of the steel sheet and dried at a time.

Samples for tests were taken from each of the electrical steel sheets with insulating films obtained as described above and subjected to stress relief annealing (at 800° C. for 2 hours in a $N_2$ atmosphere) before the tests were performed. Here, stress relief annealing may be omitted in the case where the sample is taken by using a method in which strain is not applied when the sample is taken or in the case where the test result is not affected by the strain as in the case of SEM observation.

The film tension (tension applied to the steel sheet) of the sample obtained as described above was estimated. That is, one side of the sample was masked with an adhesive tape so that the insulating film on this side was not removed, and thereafter the insulating film on the other side was removed by immersing the sample in a 25 mass % NaOH aqueous solution at a temperature of 110° C. Thereafter, the amount of warpage of the steel sheet was measured to determine the film tension.

Film adhesiveness was evaluated by observing the length of a region in which the insulating film was peeled when the electrical steel sheet with the insulating film obtained as described above was sheared in the rolling direction. At an edge of the sheared sample having a length of 20 mm (sheared edge), the length of the region in which the insulating film was peeled in a direction perpendicular to the rolling direction was measured. It was judged as a good adhesiveness when the maximum length was 100 μm or less. It was judged as a poor adhesiveness when the length was more than 100 μm. Although there is no particular limitation on the method used for determining the length of the region in which the insulating film was peeled, the length may be determined by, for example, SEM observation at a magnification of 50 times.

The determination of a magnetic property (iron loss ($W_{17/50}$)) was performed by using the method in accordance with JIS C 2550. Samples having a length in a direction perpendicular to the rolling direction of 30 mm and a length in the rolling direction of 280 mm which had been taken by shearing the electrical steel sheets with insulating films obtained as described above and which had been subjected to stress relief annealing (at 800° C. for 2 hours in a $N_2$ atmosphere). Here, the magnetic flux density ($B_8$) of all the samples was 1.93 T.

As indicated in Table 1, it is clarified that the sample which was placed for drying such that the surface of the steel sheet was vertical after application had been performed with a difference between the speed of steel sheet and the speed of applicator of the coater of 2.0 m/min was excellent in terms of film tension and film adhesiveness.

TABLE 1

| | Drying Way | Film Tension (MPa) | Iron Loss W17/50 (W/kg) | Film Adhesiveness |
|---|---|---|---|---|
| Roll coater | Horizontal | 10.6 | 0.97 | Poor |
| 0 m/min*) | Vertical | 10.6 | 0.97 | Poor |
| Bar Coater | Horizontal | 10.6 | 0.97 | Poor |
| 0.5 m/min*) | Vertical | 10.6 | 0.97 | Poor |
| Bar Coater | Horizontal | 11.3 | 0.96 | Poor |
| 2.0 m/min*) | Vertical | 12.6 | 0.94 | Good |

*) Difference between speed of the steel sheet and the speed of applicator of the coater The present inventors consider that the reason why a good result was obtained in the case where the difference between the speed of steel sheet and the speed of applicator of the coater was 2.0 m/min in the test described above is because the difference between the speed of applicator (roll or bar in this case) and the speed of steel sheet when application is performed has an effect. That is, in the case of the natural-type roll coater having two rolls which was used in item 1), because the steel sheet (cut steel sheet) is transported by using the applicator roll of the roll coater, a difference between the moving speed of the steel sheet and the circumference speed of the applicator roll is 0. On the other hand, in the case of the bar coater, whose applicator was a bar, used in items 2) and 3), an application speed (moving speed of the bar) corresponds to a difference between the speed of steel sheet and the speed of applicator of the coater. Therefore, it is considered that a difference between the speed of steel sheet and the speed of applicator of the coater when a film is formed is important for achieving good film properties of an insulating film containing a fibrous material. In addition, the test results varied depending on the manner in which the steel sheet was placed before drying after application had been performed with a difference between the speed of steel sheet and the speed of applicator of the coater of 2.0 m/min. Accordingly, it is considered that the manner in which a steel sheet is placed (angle with respect to a horizontal plane) before drying is also important.

Hereafter, each of the constitutions of aspects of the present invention will be described.

There is no particular limitation on the steel sheet used in accordance with aspects of the present invention. However, an electrical steel sheet is advantageously used because the film tension can be controlled by controlling the orientation of the fibrous material in the insulating film, and the magnetic properties are improved. As the electrical steel sheet, either of a grain-oriented electrical steel sheet and a non-oriented electrical steel sheet may be used. There is no particular limitation on the method used for manufacturing the electrical steel sheet, and, for example, a known method may be used for manufacturing. Examples of preferable grain-oriented electrical steel sheets include the grain-oriented electrical steel sheet manufactured by using the following method.

First, the preferable chemical composition of the steel will be described. Hereinafter, "%", which is the unit of the content of each of the elements, denotes "mass %", unless otherwise noted.

C: 0.001% to 0.10%

C is a constituent which is effective for forming crystal grains with a Goss orientation, and it is preferable that the C content be 0.001% or more to effectively realize such a function. On the other hand, in the case where the C content is more than 0.10%, poor decarburization may occur, even in the case where decarburization annealing is performed. Therefore, it is preferable that the C content be 0.001% to 0.10%.

Si: 1.0% to 5.0%

Si is a constituent which is necessary to decrease iron loss by increasing electrical resistance and to enable high-temperature heat treatment by stabilizing the BCC microstructure of iron, and it is preferable that the Si content be 1.0% or more. On the other hand, in the case where the Si content is more than 5.0%, it may be difficult to perform ordinary cold rolling. Therefore, it is preferable that the Si content be 1.0% to 5.0%. It is more preferable that the Si content be 2.0% to 5.0%.

Mn: 0.01% to 1.0%

Mn not only effectively contributes to preventing hot brittleness of steel but also functions as a crystal grain growth inhibitor by forming precipitates such as MnS and MnSe in the case where S and Se exist. To effectively realize such functions, it is preferable that the Mn content be 0.01% or more. On the other hand, in the case where the Mn content is more than 1.0%, there may be a decrease in effectiveness as an inhibitor due to an increase in the grain diameter of precipitates such as MnSe. Therefore, it is preferable that the Mn content be 0.01% to 1.0%.

sol.Al: 0.003% to 0.050%

Since Al is an effective constituent which functions as an inhibitor by forming a dispersion second phase in the form of AlN in steel, it is preferable that Al be added in the form of sol.Al in an amount of 0.003% or more. On the other hand, in the case where Al is added in the form of sol.Al in an amount of more than 0.050%, there may be a decrease in effectiveness as an inhibitor due to coarsening of AlN precipitated. Therefore, it is preferable that Al be added in the form of sol.Al in an amount of 0.003% to 0.050%.

N: 0.001% to 0.020%

Since N is, like Al, also a constituent which is necessary to form AlN, it is preferable that the N content be 0.001% or more. On the other hand, in the case where the N content is more than 0.020%, swelling or the like may occur when slab is heated. Therefore, it is preferable that the N content be 0.001% to 0.020%.

One or both selected from S and Se: 0.001% to 0.05% in total

S and Se are effective constituents which function as inhibitors by combining with Mn and Cu to form a dispersion second phase in steel in the form of MnSe, MnS, $Cu_{2-x}Se$, and $Cu_{2-x}S$. To realize the useful effect due to addition, it is preferable that the total content of one or both selected from S and Se be 0.001% or more. On the other hand, in the case where the total content of one or both selected from S and Se is more than 0.05%, there may be a case where the solid solution formation of S and Se is incomplete when slab is heated and where a surface defect occurs in a product. Therefore, in the case where one or both of S and Se are added, it is preferable that the total content be 0.001% to 0.05%.

It is preferable that the constituents described above be the basic constituents of steel. In addition, the remainder of the chemical composition which differs from the constituents described above may be Fe and incidental impurities.

In addition, the chemical composition described above may further contain one or more selected from Cu: 0.2% or less, Ni: 0.5% or less, Cr: 0.5% or less, Sb: 0.1% or less, Sn: 0.5% or less, Mo: 0.5% or less, and Bi: 0.1% or less. By adding elements which function as auxiliary inhibitors, it is possible to further improve magnetic properties. Examples of such elements include the elements described above, which are selected from the viewpoints of ease of crystal grain boundary segregation and surface segregation. To realize the useful effect of each of the elements, if contained, it is preferable that the Cu content be 0.01% or more, the Ni content be 0.01% or more, the Cr content be 0.01% or more, the Sb content be 0.01% or more, the Sn content be 0.01% or more, the Mo content be 0.01% or more, and Bi content be 0.001% or more. In addition, in the case where the content of each of the elements described above is more than the respective upper limits described above, the surface appearance of the film and secondary recrystallization tend to be poor. Therefore, it is preferable that the content of each of the elements described above be within the respective ranges.

Moreover, the chemical composition may further contain one, two, or more selected from B: 0.01% or less, Ge: 0.1% or less, As: 0.1% or less, P: 0.1% or less, Te: 0.1% or less, Nb: 0.1% or less, Ti: 0.1% or less, and V: 0.1% or less in addition to the constituents described above. By adding one, two, or more of these elements, there is a further increase in the effect of inhibiting crystal grain growth. Therefore, it is possible to stably achieve a higher magnetic flux density. Such an effect becomes saturated in the case where the content of each of these elements is more than the respective upper limits described above. Therefore, in the case where these elements are added, the content of each of these elements is set to be equal to or less than the respective upper limits described above. Although there is no particular limitation on the lower limits of the contents of these elements, to realize the useful effect of each of the elements, it is preferable that the B content be 0.001% or more, the Ge content be 0.001% or more, the As content be 0.005% or more, the P content be 0.005% or more, the Te content be 0.005% or more, the Nb content be 0.005% or more, the Ti content be 0.005% or more, and the V content be 0.005% or more.

The method for forming a film according to aspects of the present invention includes at least a process (process A) of applying a treatment solution for forming a film to the surface of a steel sheet, a process (process B) of inclining the surface of the steel sheet, to which the treatment solution for forming a film has been applied, at a predetermined angle with respect to a horizontal plane, and a process (process C) of drying the steel sheet to which the treatment solution for forming a film has been applied.

(Process A)

In process A, a treatment solution for forming a film (coating solution) containing a fibrous material is applied to the surface of the steel sheet described above by using a coater with a difference between the speed of steel sheet and the speed of applicator of the coater in a predetermined range.

In accordance with aspects of the present invention, the term a "fibrous material" denotes a material having an aspect ratio of 1.5 or more. Here, the aspect ratio is determined by using the following method.

A fibrous material (aggregate), which is a measurement object, is observed with a particle image analyzer ("IF-200nano" produced by JASCO International Co., Ltd.). The ratio (average Feret length/average Feret width) between the average value of a Feret width (minimum value of the distance between two parallel straight lines which are tangents to a particle image, that is, the minimum Feret diameter) and the average value of a Feret length (Feret diameter perpendicular to the minimum Feret diameter) of 1000 or more grains of a fibrous material is calculated using an image analysis software ("PIA-Pro" produced by JASCO International Co., Ltd.). The calculated ratio is defined as the aspect ratio of the fibrous material.

As the fibrous material, a synthetic material or a material on the market may be used. It is preferable that the fibrous material be an inorganic material from the viewpoint of increasing tension applied to a steel sheet. Examples of the inorganic material include $SiO_2$, $Al_2O_3$, MgO, $Al_2TiO_5$, CaO—$ZrO_2$, $Y_2O_3$—$ZrO_2$, and the like.

In the case where a vitreous insulating film is formed, it is preferable that the coating solution contains an A-constituent, that is, one, two, or more selected from phosphates, borates, and silicates of Mg, Ca, Ba, Sr, Zn, Al, and Mn, a B-constituent, that is, colloidal silica, and a C-constituent, that is, a fibrous material. In the case where a silicate as an A-constituent and a fibrous silica as a C-constituent are contained, because each of these constituents may also serve as a B-constituent. Accordingly, a B-constituent need not be separately contained. Although there is no particular limitation on the amount of a fibrous material contained, it is preferable that, in terms of solid content, a fibrous material be contained in an amount of 5 pts·mass to 70 pts·mass in the case where A-constituents are contained in an amount of 100 pts·mass. When the coating solution is prepared, the above-described constituents may be mixed in a solvent such as water.

It is preferable that the surface tension of the coating solution be 60 mN/m or more and 80 mN/m or less from the viewpoint of more effectively maintaining the below-described state in which the fibrous material is oriented. It is more preferable that the surface tension of the coating solution be 65 mN/m or more. In addition, it is more preferable that the surface tension of the coating solution be 75 mN/m or less. The surface tension of the coating solution is determined by using a pendant-drop method (at a determination temperature of 25° C.) with DMo-501 produced by Kyowa Interface Science Co., Ltd.

It is preferable that the ratio of the long axis length to the short axis length (long axis length/short axis length) of the fibrous material be 1.5 or more or more preferably 3.0 or more to more effectively maintain the orientation degree after the coating solution has been applied. In addition, it is preferable that the ratio of the long axis length to the short axis length of the fibrous material be 50.0 or less or more preferably 30.0 or less from the viewpoint of the bending peeling resistance of the formed film. Here, the long axis length and the short axis length of the fibrous material are respectively the average length of the long axis (average Feret length) of the fibrous material and the average length of the short axis (average Feret width) of the fibrous material, which are determined by using the same method as that used for determining the aspect ratio described above.

It is preferable that the linear thermal expansion coefficient of the fibrous material in a temperature range of 25° C. to 800° C. be $1.0\times10^{-3}$/K or less or more preferably $5.0\times10^{-6}$/K or less, because it is preferable that the thermal expansion coefficient of the film be small in order to increase the tension applied to the steel sheet. It is possible to determine the linear thermal expansion coefficient of the fibrous material in a temperature range of 25° C. to 800° C. by using, for example, a TMA (thermo-mechanical analyzer). Regarding the determination conditions, the measurement temperature range is set to be 25° C. to 800° C., and the heating rate is set to be 5° C./min.

There is no particular limitation on the method used for applying the coating solution to the steel sheet as long as it is possible to cause a difference between the speed of applicator of the coater and the speed of steel sheet during application. Various coaters such as a roll coater, a bar coater, a die coater, and the like may be used. It is preferable that a roll coater be used from the viewpoint of mass production.

It is necessary that the difference between the speed of steel sheet and the speed of applicator of the coater be 1.0 m/min or more when the coating solution is applied to the surface of the steel sheet. In the case where such a difference in speed is less than 1.0 m/min, since it is not possible to orient, in an optimum manner, the fibrous material in the rolling direction (orient the long axis of the fibrous material in the rolling direction), it is not possible to realize the effect of increasing film tension and film adhesiveness. It is preferable that such a difference in speed be 2.0 m/min or more. In the case where such a difference in speed is excessively large, there is an increase in the wear rate of the applicator of the coater. Therefore, it is preferable that such a difference in speed be 100 m/min or less. In addition, in the case of a roll coater, it is preferable that the moving speed (v) of the steel sheet be larger than the circumferential speed ($v_R$) of the applicator roll, that is, $v>v_R$, from the viewpoint of achieving uniform coating appearance by inhibiting a ribbing defect from occurring. Here, the application of the coating solution is performed at room temperature (15° C. to 35° C.). In addition, in the case of a bar coater, the speed (m/min) of the applicator of the coater is the moving speed (m/min) of the bar (bar coater), which is the applicator. In the case of a roll coater, the speed (m/min) of the applicator of the roll coater is the circumferential speed (m/min) of the roll (roll coater), which is the applicator. In addition, in the case of a roll coater, the roll coater may be of a natural type, in which the moving direction of the steel sheet and the circumferential moving direction of the applicator roll are the same, or of a reverse type, in which the moving direction of the steel sheet and the circumferential moving direction of the applicator roll are opposite to each other. In addition, the above-mentioned difference in speed is the absolute value of a difference between the speed of steel sheet and the speed of applicator of the coater.

(Process B)

In process B, the surface of the steel sheet, to which the treatment solution for forming a film (coating solution) has been applied in process A, is inclined at an angle of 10° or more with respect to a horizontal plane. That is, the surface of the steel sheet is inclined so that the application direction of the coating solution on the surface of the steel sheet forms an angle of 10° or more with a horizontal plane. This is for the purpose of preventing the orientation of the fibrous material, which has been oriented through the difference between the speed of steel sheet and the speed of applicator of the coater in process A, from being randomized before they are fixed by drying. It is preferable that the operation, in which the surface of the steel sheet is inclined at an angle of 10° or more with respect to a horizontal plane (horizontal direction), be performed immediately after the application of the coating solution in process A, and, for example, such an operation is performed within 10 s after the application of the coating solution has been performed by using the applicator of the coater (for example, a roll coater). It is more preferable that such an operation be performed within 1 s. In addition, after the surface of the steel sheet has been inclined at an angle of 10° or more with respect to a horizontal plane through such an operation, such a state is maintained until drying is started. Here, drying is regarded as being started when the temperature of the steel sheet (temperature of the surface of the steel sheet), to which the coating solution has been applied, reaches 100° C. after heating has been started. That is, the state, in which the steel sheet is inclined at an angle of 10° or more with respect to a horizontal plane, is maintained until the temperature of the steel sheet reaches 100° C. after the application of the coating solution has been performed. It is preferable that such a state be maintained until the temperature of the steel sheet reaches 200° C. Here, in the case where process A to process C are continuously performed, the angle at which the steel sheet is inclined is defined as an angle formed between a horizontal plane and a straight line connecting a position on the surface of the steel sheet (for example, the central position in the width direction of the surface of the steel sheet) when the steel sheet leaves the applicator of the coater at the end of process A and the position on the surface of the steel sheet when drying is started. In addition, in the case where process A to process C are not continuously performed, the angle is defined as an angle formed between a horizontal plane and the surface of the steel sheet to which the coating solution has been applied (the application direction of the coating solution on the surface of the steel sheet). There is no particular limitation on the upper limit of the angle at which the steel sheet is inclined with respect to a horizontal plane, and the steel sheet may be inclined vertically (at an angle of 90° with respect to a horizontal plane). In addition, when the surface of the steel sheet to which the coating solution has been applied is inclined at an angle of 10° or more with respect to a horizontal plane, the surface of the steel sheet to which the coating solution has been applied may be upwardly inclined at an angle of 10° or more with respect to a horizontal plane or downwardly inclined at an angle of 10° or more with respect to a horizontal plane. That is, when viewed in the application direction of the coating solution on the surface of the steel sheet, the surface of the steel sheet may be inclined at an angle of 10° or more with respect to a horizontal plane so that a position on the upstream side in the application direction of the coating solution is higher than the position on the downstream side, or the surface of the steel sheet may be inclined at an angle of 10° or more with respect to a horizontal plane so that a position on the upstream side in the application direction of the coating solution is lower than the position on the downstream side. In accordance with aspects of the present invention, in process B, it is possible to realize the same effect in the case where the surface of the steel sheet to which the coating solution has been applied is upwardly inclined at an angle of 10° or more with respect to a horizontal plane and in the case where the surface of the steel sheet is downwardly inclined at an angle of 10° or more with respect to a horizontal plane.

(Process C)

Process C is a process in which the coating solution which has been applied to the surface of the steel sheet described above is dried. Drying is performed by heating the steel sheet in, for example, a drying furnace. As described above, the drying start temperature is 100° C. In addition, although there is no particular limitation on the upper limit of the drying temperature in process C, for example, the upper limit may be set to be 400° C. In addition, the drying time is set to be, for example, 1 sec or more. In addition, the drying time is set to be, for example, 60 sec or less. Here, after drying has been started, the state of the steel sheet, which has been inclined at a predetermined angle with respect to a horizontal plane in process B, may be maintained while drying is performed or changed (for example, in process C, the surface of the steel sheet may be set back to be horizontal, or the surface of the steel sheet may be inclined at a larger angle with respect to a horizontal plane than in process B). Through process A to process C described above, the film is formed on the surface of the steel sheet.

After process C has been performed as described above, to further increase the tension, a baking treatment is performed. A baking temperature (temperature of the surface of the steel sheet) for a baking treatment may be set to be, for example, 800° C. or higher. In addition, a baking temperature may be set to be, for example, 1000° C. or lower. In addition, a baking time may be set to be, for example, 10 sec or more. In addition, a baking time may be set to be, for example, 120 sec or less.

Hereafter, the preferable method for manufacturing an electrical steel sheet with an insulating film will be described.

Molten steel having the chemical composition described above is prepared by using a conventionally known refining process and made into a steel material (steel slab) by using a continuous casting method or an ingot casting-slabbing method. Subsequently, the steel slab described above is subjected to hot rolling to obtain a hot rolled steel sheet and subjected to hot-rolled sheet annealing as needed, and the hot rolled steel sheet is subjected to cold rolling once or twice or more with intermediate annealing interposed between the cold rolling to obtain a cold rolled steel sheet having a final thickness. Subsequently, after having performed primary recrystallization annealing and decarburization annealing, annealing separator composed mainly of MgO is applied. Final finish annealing is thereafter performed to form a film layer composed mainly of forsterite. Then an insulating film is formed on the film layer described above by using the method for forming a film described above. Subsequently, flattening annealing may be performed. Or the baking treatment on the insulating film described above may also serve as flattening annealing. Here, regarding the manufacturing conditions other than those applied for the method for forming the film, conventionally known conditions may be applied, and there is no particular limitation. For example, a separator agent composed mainly of $Al_2O_3$ or the like is applied after decarburization annealing has been performed without forming forsterite. Thereafter, a base film layer is formed by using a CVD method, a PVD method, a sol-gel method, a steel sheet-oxidizing method, or the like after final finish annealing has been performed. Then an insulating film can be formed on the base film layer by using the method for forming a film described above. In addition, in the case where the insulating film according to aspects of the present invention is used, it is possible to form an insulating film directly on a base steel surface without forming a base film layer.

It is preferable that the insulating film contain a phosphate, a borate, a silicate, and the like in addition to the fibrous material, and it is particularly preferable that the film contain a phosphate, which is generally used for an insulating film nowadays. Since a phosphate tends to take up moisture in the atmosphere, to decrease such a tendency, it is preferable that the phosphate contain one, two, or more metallic elements selected from Mg, Al, Ca, Ba, Sr, Zn, Ti, Nd, Mo, Cr, B, Ta, Cu, and Mn.

The insulating film according to aspects of the present invention may be a Cr-containing insulating film or a Cr-free insulating film. In the case of a Cr-free insulating film, there is a tendency for film tension to be deteriorated compared with the case of a Cr-containing insulating film. Because the insulating film according to aspects of the present invention is excellent in terms of film tension, it is preferable that such aspects of the present invention be used for a Cr-free insulating film.

The tension applied to a steel sheet by the insulating film is determined from the amount of warpage (x) of the steel sheet obtained by masking one side of the steel sheet with an adhesive tape so that the insulating film on this side is not removed and by then removing the insulating film on the other side in an alkali, an acid, or the like. More specifically, the amount of warpage is calculated by using (equation 1) below.

$$\text{Tension applied to steel sheet (MPa)} = \text{Young's modulus of steel sheet (GPa)} \times \text{steel sheet thickness (mm)} \times \text{amount of warpage (mm)} \div (\text{warpage measurement length (mm)})^2 \times 10^3 \quad \text{(equation 1)}$$

Here, Young's modulus is assigned to a value of 132 GPa.

It is preferable that the tension applied to a steel sheet by the insulating film be 10 MPa or more or more preferably 12 MPa or more. This tension is a tension applied to a steel sheet by the insulating film in the rolling direction. By increasing the tension, it is possible to decrease iron loss and to further decrease a noise when the steel sheet is used for a transformer.

It is preferable that the total coating weight of the insulating film be 4.0 g/m$^2$ or more on both sides of a steel sheet after having been dried. In addition, it is preferable that the total coating weight of the insulating film be 30.0 g/m$^2$ or less on both sides of a steel sheet after having been dried. In the case where the total coating weight is 4.0 g/m$^2$ or more on both sides of a steel sheet after having been dried, it is easier to improve the interlayer insulation. On the other hand, in the case where the total coating weight is 30.0 g/m$^2$ or less on both sides of a steel sheet after having been dried, it is easy to inhibit a deterioration in lamination factor. It is more preferable that the total coating weight be 6.0 $g/m^2$ or more on both sides of a steel sheet after having been dried. In addition, it is more preferable that the total coating weight be 24.0 $g/m^2$ or less on both sides of a steel sheet after having been dried.

EXAMPLES

Example 1

After having heated a slab for a silicon steel sheet having a chemical composition containing, by mass %, Si: 3.25%, C: 0.04%, Mn: 0.08%, S: 0.002%, sol.Al: 0.015%, N: 0.006%, Cu: 0.05%, Sb: 0.01% at a temperature of 1150° C. for 20 minutes, hot rolling was performed on the heated slab to obtain a hot rolled steel sheet having a thickness of 2.4 mm. After having performed annealing on the obtained hot rolled steel sheet at a temperature of 1000° C. for 1 minute, cold rolling was performed to obtain a cold rolled steel sheet having a final thickness of 0.27 mm. The obtained cold rolled steel sheet was heated from room temperature to a temperature of 820° C. at a heating rate of 100° C./s and subjected to primary recrystallization annealing at a temperature of 820° C. for 60 seconds in a wet atmosphere. Subsequently, an aqueous-slurry annealing separator containing MgO in an amount of 100 pts·mass and $TiO_2$ in an amount of 5 pts·mass was applied to the annealed steel sheet and dried. After having heated the dried steel sheet from a temperature of 300° C. to a temperature of 800° C. over 100 hours, the sample was heated to a temperature of 1200° C. at a heating rate of 50° C./hr and then subjected to final finish annealing at a temperature of 1200° C. for 5 hours to prepare a steel sheet having a base film composed mainly of forsterite.

Subsequently, an aqueous solution containing magnesium primary phosphate in an amount of 100 pts·mass in terms of solid content, colloidal silica in an amount of 50 pts·mass in terms of $SiO_2$ solid content, and cordierite (having a ratio of the long axis length to the short axis length of 3.0) in an amount of 15 pts·mass was diluted with pure water so as to have a specific gravity of 1.180 to prepare a coating solution. The coating solution was applied to the surface of the steel sheet prepared as described above under the conditions given in Table 2 by using a roll coater so that the total coating weight was 9.0 $g/m^2$ on both sides of a steel sheet after having been dried. Immediately after the prepared coating solution had been applied, the surface of the steel sheet, to which the coating solution had been applied, was inclined under the conditions given in Table 2 until drying started (until the surface temperature of the steel sheet reached 100° C.), and the surface of the steel sheet inclined in such a manner was dried at a temperature of 300° C. for 20 seconds to form an insulating film on the surface of the steel sheet. Subsequently, baking was performed at a temperature of 850° C. for 30 seconds in an atmosphere containing 100 vol % of $N_2$. Here, the roll coater had applicator rolls for both sides. The type of the roll coater was a natural type, in which the moving directions of the rolls and that of the steel sheet were the same, and the moving speed of the steel sheet and the circumferential speed of the rolls were varied as indicated in Table 2. The film tension, iron loss, film adhesiveness, and bending peeling diameter of the samples of the electrical steel sheet with insulating films obtained as described above were evaluated.

Regarding the film tension (tension applied to the steel sheet), after having taken a sample having a length in a direction perpendicular to the rolling direction of 30 mm and a length in the rolling direction of 280 mm by cutting the steel sheet, stress relief annealing (at 800° C. for 2 hours in a $N_2$ atmosphere) was performed. One side of the taken sample was masked with an adhesive tape so that the insulating film on this side was not removed, the insulating film on the other side was then removed by immersing the sample in a 25 wt % NaOH aqueous solution at a temperature of 110° C. The amount of warpage of the steel sheet was thereafter determined, and the film tension was calculated by using (equation 1) above.

The film adhesiveness was evaluated by observing the length of a region in which an insulating film was peeled when the sample was sheared in the rolling direction. At the edge (sheared edge) of the sheared sample having a length of 20 mm, a length in a direction perpendicular to the rolling direction of the region, in which the insulating film was peeled, was measured by SEM observation at a magnification of 50 times. It was judged as a good adhesiveness when the maximum length was 100 μm or less. It was judged as poor adhesiveness when the length was more than 100 μm.

The determination of a magnetic property (iron loss ($W_{17/50}$)) was performed by using the method in accordance with JIS C 2550. Samples having a length in a direction perpendicular to the rolling direction of 30 mm and a length in the rolling direction of 280 mm which had been taken by shearing the obtained steel sheet and which had been subjected to stress relief annealing (at 800° C. for 2 hours in a $N_2$ atmosphere). Here, the magnetic flux density ($B_8$) of all the samples was 1.94 T.

The bending peeling diameter was evaluated, after having wound a sample, which has a length in a direction perpendicular to the rolling direction of 30 mm and a length in the rolling direction of 280 mm taken from the obtained sample, around a round bar having a diameter of 60 mm and bent back the bent sample by 180°. A visual observation was performed to determine whether or not peeling of an insulating film occurred. The similar observations were repeated with a round bar having a diameter 5 mm smaller than the previous one until the minimum diameter (bending peeling diameter), with which the peeling of the insulating film was not recognized by visual observation, was found. In this evaluation, it was possible to judge that the smaller the above-described bending peeling diameter, the better the film adhesiveness. It was judged as a good film adhesiveness when a bending peeling diameter of 30 mm or less.

As indicated in Table 2, it is possible to form an insulating film which is good in terms of all of film tension, iron loss, film adhesiveness, and bending peeling resistance in the case where a coating solution is applied under a condition in which the difference between the moving (transporting) speed of a steel sheet and the circumferential speed of the applicator roll of a roll coater is 1.0 m/min or more and the surface of the steel sheet is inclined at an angle of 10° or more with respect to a horizontal plane (horizontal direction) after the coating solution has been applied and before drying is started.

TABLE 2

| No | Steel Sheet Moving Speed | Applicator Roll Circumferential Speed | Speed Difference*1 | Inclination and Direction until Drying Starts | | Film Tension | Iron Loss W17/50 | Film Adhesiveness | Bending Peeling Diameter | Note |
|---|---|---|---|---|---|---|---|---|---|---|
| | m/min | m/min | m/min | deg*2 | Direction*3 | MPa | W/kg | μm | mm | |
| 1 | 140 | 120 | 20 | 0 | — | 10.6 | 0.90 | 120 | 40 | Comparative Example |
| 2 | 140 | 120 | 20 | 5 | Downward | 10.7 | 0.90 | 120 | 40 | Comparative Example |
| 3 | 140 | 138 | 2.0 | 10 | Downward | 12.5 | 0.86 | 53 | 30 | Example |
| 4 | 140 | 138 | 2.0 | 10 | Upward | 12.5 | 0.86 | 53 | 30 | Example |
| 5 | 140 | 140 | 0 | 10 | Downward | 10.6 | 0.90 | 120 | 40 | Comparative Example |
| 6 | 140 | 142 | 2.0 | 10 | Downward | 12.3 | 0.86 | 55 | 30 | Example |
| 7 | 140 | 142 | 2.0 | 50 | Downward | 12.5 | 0.86 | 50 | 30 | Example |
| 8 | 140 | 142 | 2.0 | 90 | Downward | 12.8 | 0.85 | 50 | 30 | Example |
| 9 | 140 | 142 | 2.0 | 90 | Upward | 12.8 | 0.85 | 50 | 30 | Example |
| 10 | 140 | 160 | 20 | 0 | — | 10.6 | 0.90 | 110 | 35 | Comparative Example |
| 11 | 140 | 160 | 20 | 7 | Downward | 10.7 | 0.89 | 110 | 40 | Comparative Example |
| 12 | 200 | 120 | 80 | 20 | Downward | 12.9 | 0.84 | 50 | 30 | Example |
| 13 | 200 | 120 | 80 | 20 | Upward | 12.9 | 0.84 | 50 | 30 | Example |
| 14 | 200 | 150 | 50 | 30 | Downward | 12.9 | 0.85 | 45 | 30 | Example |
| 15 | 200 | 190 | 10 | 30 | Downward | 12.7 | 0.85 | 36 | 30 | Example |
| 16 | 200 | 195 | 5.0 | 30 | Downward | 12.8 | 0.84 | 52 | 30 | Example |
| 17 | 200 | 195 | 5.0 | 60 | Downward | 12.8 | 0.84 | 51 | 30 | Example |
| 18 | 200 | 195 | 5.0 | 60 | Upward | 12.8 | 0.84 | 51 | 30 | Example |
| 19 | 200 | 199 | 1.0 | 10 | Downward | 12.8 | 0.84 | 35 | 30 | Example |
| 20 | 200 | 200 | 0 | 20 | Downward | 10.4 | 0.91 | 115 | 30 | Comparative Example |
| 21 | 200 | 201 | 1.0 | 10 | Downward | 12.4 | 0.85 | 34 | 30 | Example |
| 22 | 200 | 205 | 5.0 | 30 | Downward | 12.3 | 0.85 | 48 | 30 | Example |
| 23 | 200 | 210 | 10 | 30 | Downward | 12.3 | 0.85 | 40 | 30 | Example |
| 24 | 200 | 250 | 50 | 30 | Downward | 12.3 | 0.85 | 29 | 30 | Example |
| 25 | 200 | 250 | 50 | 30 | Upward | 12.3 | 0.85 | 29 | 30 | Example |
| 26 | 300 | 290 | 10 | 40 | Downward | 12.7 | 0.84 | 30 | 30 | Example |
| 27 | 300 | 295 | 5.0 | 0 | — | 10.5 | 0.90 | 110 | 40 | Comparative Example |
| 28 | 300 | 305 | 5.0 | 8 | Downward | 10.8 | 0.89 | 115 | 40 | Comparative Example |
| 29 | 300 | 305 | 5.0 | 40 | Downward | 12.5 | 0.85 | 27 | 30 | Example |
| 30 | 300 | 300 | 0 | 40 | Downward | 10.6 | 0.90 | 120 | 40 | Comparative Example |
| 31 | 400 | 300 | 100 | 20 | Downward | 12.7 | 0.84 | 45 | 30 | Example |
| 32 | 400 | 390 | 10 | 20 | Downward | 12.6 | 0.85 | 44 | 30 | Example |
| 33 | 400 | 410 | 10 | 20 | Downward | 12.4 | 0.86 | 42 | 30 | Example |

*1Difference between the moving speed of the steel sheet and the circumferential speed of the applicator roll (absolute value)

*2Angle formed by the surface of the steel sheet and a horizontal plane (°)

*3Upward: the surface of the steel sheet was inclined so that the position on the upstream side in the application direction of the coating solution on the surface of the steel sheet is higher than the position on the downstream side Downward: the surface of the steel sheet was inclined so that the position on the upstream side in the application direction of the coating solution on the surface of the steel sheet is lower than the position on the downstream side —;the surface of the steel sheet was not inclined Underlined portions indicate items out of the ranges of the present invention.

Example 2

After having heated a slab for a silicon steel sheet having a chemical composition containing, by mass %, Si: 3.25%, C: 0.04%, Mn: 0.08%, S: 0.002%, sol.Al: 0.015%, N: 0.006%, Cu: 0.05%, Sb: 0.01% at a temperature of 1150° C. for 20 minutes, hot rolling was performed on the heated slab to obtain a hot rolled steel sheet having a thickness of 2.2 mm. After having performed annealing on the obtained hot rolled steel sheet at a temperature of 1000° C. for 1 minute, cold rolling was performed to obtain a cold rolled steel sheet having a final thickness of 0.23 mm. Then, the cold rolled steel sheet was heated from room temperature to a temperature of 820° C. at a heating rate of 50° C./s and subjected to primary recrystallization annealing at a temperature of 820° C. for 60 seconds in a wet atmosphere. Subsequently, an aqueous-slurry annealing separator containing MgO in an amount of 100 pts·mass and $TiO_2$ in an amount of 10 pts·mass was applied to the steel sheet and dried. After having heated the dried steel sheet from a temperature of 300° C. to a temperature of 800° C. over 100 hours, the steel sheet was subjected to a final finish annealing process of heating the steel sheet to a temperature of 1200° C. at a heating rate of 50° C./hr and then annealing the heated steel sheet at a temperature of 1200° C. for 5 hours to prepare a steel sheet having a base film composed mainly of forsterite.

Subsequently, each of the aqueous solutions containing the components given in Table 3 was diluted with pure water so as to have a specific gravity of 1.25 to prepare a coating solution. The prepared coating solution was applied, under the conditions given in Table 4, to the surface of the steel sheet prepared as described above by using a roll coater so that the total coating weight was 10.0 g/m$^2$ on both sides of the steel sheet after having been dried. Immediately after the coating solution had been applied, the surface of the steel sheet, to which the coating solution had been applied, was inclined under the conditions given in Table 4 (here, in all the cases other than No. 1 in the present Example 2, the surface of the steel sheet was downwardly inclined with respect to a horizontal plane, that is, so that a position on the upstream side in the application direction of the coating solution on the surface of the steel sheet is lower than the position on the downstream side) until drying started (until the surface temperature of the steel sheet reached 100° C.) The surface of the steel sheet inclined in such a manner was dried at a temperature of 300° C. for 20 seconds to form an insulating film on the surface of the steel sheet. Subsequently, baking was performed at a temperature of 850° C. for 30 seconds in an atmosphere containing 100 vol % of $N_2$. The film tension, iron loss, film adhesiveness, and bending peeling diameter of the samples of the electrical steel sheet with an insulating film obtained as described above were evaluated as in the case of Example 1. Here, the magnetic flux density ($B_8$) of all the samples was 1.93 T.

As indicated in Table 4, it is possible to form an insulating film which is good in terms of all of film tension, iron loss, film adhesiveness, and bending peeling resistance in the case where a coating solution is applied under a condition in which the difference between the moving (transporting) speed of a steel sheet and the circumferential speed of the applicator roll of a roll coater is 1.0 m/min or more and the surface of the steel sheet is inclined at an angle of 10° or more with respect to a horizontal plane (horizontal direction) after the coating solution has been applied and before drying is started.

TABLE 3

| | Phosphate (g) (Solid Content) | | | | | | | | $Na_2B_4O_5(OH)_4\cdot 8H_2O$ | Colloidal Silica | Fibrous Material (Solid Content) | | | | Coating Solution |
|---|---|---|---|---|---|---|---|---|---|---|---|---|---|---|---|
| Coating Solution No. | Mg Phosphate | Ca Phosphate | Ba Phosphate | Sr Phosphate | Zn Phosphate | Al Phosphate | Mn Phosphate | Cr Phosphate | (g) (Solid Content) | (Spherical) (g) (Solid Content) | Kind | Long Axis Length/Short Axis Length | Linear Thermal Expansion Coefficient ($10^{-6}$/K) | Content (g) | Surface Tension mN/m |
| Coating Solution 1 | 100 | — | — | — | — | — | — | — | — | 0 | Colloidal Silica | 5.0 | 2.3 | 50 | 70 |
| Coating Solution 2 | — | — | — | — | — | 100 | — | — | — | 0 | Colloidal Silica | 10 | 2.3 | 50 | 72 |
| Coating Solution 3 | 50 | — | — | — | — | 50 | — | — | — | 70 | $Al_2O_3$ | 1.5 | 7.8 | 5 | 60 |
| Coating Solution 4 | — | — | — | — | — | — | — | 100 | — | 50 | $Al_2O_3$ | 3.0 | 8.1 | 20 | 65 |
| Coating Solution 5 | — | 100 | — | — | — | — | — | — | — | 100 | MgO | 1.5 | 13.5 | 25 | 80 |
| Coating Solution 6 | — | 50 | — | 50 | — | — | — | — | — | 150 | MgO | 1.8 | 13.5 | 30 | 80 |
| Coating Solution 7 | 50 | — | 50 | — | — | — | — | — | — | 120 | $Al_2TiO_5$ | 20 | 0.8 | 20 | 70 |
| Coating Solution 8 | — | — | — | — | 50 | 50 | — | — | — | 80 | $Al_2TiO_5$ | 25 | 0.8 | 10 | 75 |
| Coating Solution 9 | 80 | — | — | — | — | — | 20 | — | — | 80 | $CaO\text{-}ZrO_2$ | 11.3 | 9.5 | 30 | 80 |
| Coating Solution 10 | 80 | — | — | — | — | — | 20 | — | — | 80 | $CaO\text{-}ZrO_2$ | 11.3 | 9.5 | 30 | 80 |
| Coating Solution 11 | — | — | — | — | — | 50 | — | 50 | — | 80 | $Y_2O_3\text{-}ZrO_2$ | 50 | 10.2 | 10 | 68 |
| Coating Solution 12 | 100 | — | — | — | — | — | — | — | — | 70 | $Y_2O_3\text{-}ZrO_2$ | 55 | 10.2 | 20 | 65 |
| Coating Solution 13 | — | — | — | — | — | — | — | — | 40 | 20 | Colloidal Silica | 15 | 2.3 | 60 | 71 |

TABLE 4

| No | Coating Solution No. | Steel Sheet Moving Speed m/min | Applicator Roll Circumferential Speed m/min | Speed Difference*1 m/min | Inclination until Drying Starts*2 deg | Film Tension MPa | Iron Loss W17/50 W/kg | Film Adhesiveness μm | Bending Peeling Diameter mm | Note |
|---|---|---|---|---|---|---|---|---|---|---|
| 1 | 1 | 140 | 120 | 20 | 0 | 11.2 | 0.86 | 120 | 35 | Comparative Example |
| 2 | 2 | 140 | 138 | 2.0 | 10 | 13.2 | 0.82 | 53 | 20 | Example |
| 3 | 2 | 160 | 160 | 0 | 10 | 11.0 | 0.86 | 120 | 35 | Comparative Example |
| 4 | 3 | 160 | 162 | 2.0 | 10 | 12.8 | 0.82 | 55 | 20 | Example |
| 5 | 4 | 160 | 162 | 2.0 | 10 | 12.3 | 0.84 | 50 | 20 | Example |
| 6 | 5 | 200 | 190 | 10 | 30 | 11.8 | 0.84 | 48 | 20 | Example |
| 7 | 6 | 200 | 190 | 10 | 30 | 11.8 | 0.85 | 45 | 20 | Example |
| 8 | 7 | 200 | 190 | 10 | 30 | 13.8 | 0.82 | 36 | 20 | Example |
| 9 | 8 | 200 | 195 | 5.0 | 30 | 13.8 | 0.82 | 38 | 25 | Example |
| 10 | 9 | 200 | 199 | 1.0 | 10 | 12.8 | 0.84 | 35 | 25 | Example |

TABLE 4-continued

| No | Coating Solution No. | Steel Sheet Moving Speed m/min | Applicator Roll Circumferential Speed m/min | Speed Difference*1 m/min | Inclination until Drying Starts*2 deg | Film Tension MPa | Iron Loss W17/50 W/kg | Film Adhesiveness µm | Bending Peeling Diameter mm | Note |
|---|---|---|---|---|---|---|---|---|---|---|
| 11 | 10 | 250 | 200 | 50 | 20 | 12.6 | 0.84 | 39 | 20 | Example |
| 12 | 11 | 250 | 252 | 2.0 | 10 | 12.6 | 0.85 | 34 | 20 | Example |
| 13 | 12 | 300 | 250 | 50 | 30 | 12.3 | 0.85 | 48 | 30 | Example |
| 14 | 13 | 300 | 280 | 20 | 30 | 13.1 | 0.82 | 40 | 25 | Example |

*1Difference between the moving speed of the steel sheet and the circumferential speed of the applicator roll (absolute value)

*2Angle formed by the surface of the steel sheet and a horizontal plane (°)

Underlined portions indicate items out of the ranges of the present invention.

The invention claimed is:

1. A method for forming a film on a surface of a steel sheet, the method comprising:

applying a treatment solution for forming a film containing a fibrous material to the surface of the steel sheet by using a coater under a condition in which a difference between a speed of the steel sheet and a speed of an applicator of the coater is 1.0 m/min or more, inclining the surface of the steel sheet, to which the treatment solution for forming the film has been applied, at an angle of 10° or more with respect to a horizontal plane until a drying is started, and thereafter starting the drying of the steel sheet.

2. The method for forming a film according to claim 1, wherein a surface tension of the treatment solution for forming a film is 60 mN/m or more and 80 mN/m or less.

3. The method for forming a film according to claim 1, wherein a ratio of a long axis length to a short axis length (long axis length/short axis length) of the fibrous material is 1.5 or more and 50.0 or less.

4. The method for forming a film according to claim 2, wherein a ratio of a long axis length to a short axis length (long axis length/short axis length) of the fibrous material is 1.5 or more and 50.0 or less.

5. The method for forming a film according to claim 1, wherein a linear thermal expansion coefficient of the fibrous material in a temperature range of 25° C. to 800° C. is $1.0\times10^{-5}$/K or less.

6. The method for forming a film according to claim 2, wherein a linear thermal expansion coefficient of the fibrous material in a temperature range of 25° C. to 800° C. is $1.0\times10^{-5}$/K or less.

7. The method for forming a film according to claim 3, wherein a linear thermal expansion coefficient of the fibrous material in a temperature range of 25° C. to 800° C. is $1.0\times10^{-5}$/K or less.

8. The method for forming a film according to claim 4, wherein a linear thermal expansion coefficient of the fibrous material in a temperature range of 25° C. to 800° C. is $1.0\times10^{-5}$/K or less.

9. A method for manufacturing an electrical steel sheet with an insulating film, the method comprising forming an insulating film on a surface of the electrical steel sheet by using the method for forming a film according to claim 1.

10. A method for manufacturing an electrical steel sheet with an insulating film, the method comprising forming an insulating film on a surface of the electrical steel sheet by using the method for forming a film according to claim 2.

11. A method for manufacturing an electrical steel sheet with an insulating film, the method comprising forming an insulating film on a surface of the electrical steel sheet by using the method for forming a film according to claim 3.

12. A method for manufacturing an electrical steel sheet with an insulating film, the method comprising forming an insulating film on a surface of the electrical steel sheet by using the method for forming a film according to claim 4.

13. A method for manufacturing an electrical steel sheet with an insulating film, the method comprising forming an insulating film on a surface of the electrical steel sheet by using the method for forming a film according to claim 5.

14. A method for manufacturing an electrical steel sheet with an insulating film, the method comprising forming an insulating film on a surface of the electrical steel sheet by using the method for forming a film according to claim 6.

15. A method for manufacturing an electrical steel sheet with an insulating film, the method comprising forming an insulating film on a surface of the electrical steel sheet by using the method for forming a film according to claim 7.

16. A method for manufacturing an electrical steel sheet with an insulating film, the method comprising forming an insulating film on a surface of the electrical steel sheet by using the method for forming a film according to claim 8.

* * * * *